(12) United States Patent
Yeung et al.

(10) Patent No.: US 8,989,306 B1
(45) Date of Patent: Mar. 24, 2015

(54) LOW-NOISE REGULATION OF BATTERY POWER

(71) Applicant: Marvell International Ltd., Hamilton (BM)

(72) Inventors: Ken Yeung, Cupertino, CA (US); Arvind Anumula Parmanandam, San Jose, CA (US); Chieh-Te Chang, Sunnyvale, CA (US); Xiaoyue Wang, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 79 days.

(21) Appl. No.: 13/711,369

(22) Filed: Dec. 11, 2012

Related U.S. Application Data

(60) Provisional application No. 61/576,754, filed on Dec. 16, 2011.

(51) Int. Cl.
| | |
|---|---|
| *H04K 1/02* | (2006.01) |
| *H04L 25/03* | (2006.01) |
| *H04L 25/49* | (2006.01) |
| *H04B 1/04* | (2006.01) |
| *G05F 1/10* | (2006.01) |
| *H04B 1/40* | (2006.01) |

(52) U.S. Cl.
CPC .............. *H04B 1/0475* (2013.01); *G05F 1/10* (2013.01); *H04B 1/40* (2013.01)
USPC ....................................................... 375/297

(58) Field of Classification Search
None
See application file for complete search history.

(56) References Cited

U.S. PATENT DOCUMENTS

| | | | |
|---|---|---|---|
| RE40,111 E * | 2/2008 | Sanderford et al. .......... | 375/141 |
| 2007/0110053 A1* | 5/2007 | Soni et al. ..................... | 370/389 |
| 2010/0244951 A1* | 9/2010 | Smith ............................ | 330/127 |
| 2012/0146712 A1* | 6/2012 | Kull et al. ..................... | 327/530 |

* cited by examiner

*Primary Examiner* — Chieh M Fan
*Assistant Examiner* — Wednel Cadeau

(57) ABSTRACT

The present disclosure describes apparatuses and techniques for low-noise regulation of battery power. In some aspects an indication of a voltage level of a battery supplying power to a linear regulator is received, an output voltage level is determined for the linear regulator that permits the linear regulator to operate in an active condition in which noise of the power supplied by the battery is mitigated, and the linear regulator is configured to output the regulated power at the output voltage level effective to provide low-noise regulated power for components of a device.

20 Claims, 7 Drawing Sheets

LOW-NOISE REGULATION OF BATTERY POWER

RELATED APPLICATIONS

This present disclosure claims priority to U.S. Provisional Patent Application Ser. No. 61/576,754 filed Dec. 16, 2011, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Portable electronic and computing devices often rely on batteries to provide operational power when an external power source, such as an AC power adaptor, is not available. Although batteries are typically a reliable source of power, a voltage at which the power is provided varies as the battery discharges. Additionally, switching or transient loads on the battery may introduce noise (e.g., voltage ripple) on the power supplied by the battery. A power regulator of the device can compensate for the varying voltage and the noise of the power of the battery by regulating the battery-supplied power to a lower voltage.

This power regulator is effective so long as sufficient headroom is available between the voltage of the battery and the voltage of the regulated power. As the battery discharges and the voltage of the battery approaches that of the regulated power, however, the power regulator is unable to effectively reject the noise of the battery power. The noise of the battery power then passes through the power regulator to the components of the device, which are often not designed to tolerate this noise. The device, or components thereof, are typically powered-down or disabled when this condition occurs to prevent the components from attempting to operate when subjected to the noise. Thus, even when the battery has sufficient capacity to power the components of the device, the components are be powered-down to prevent the noise from disrupting the components.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving, from an analog-to-digital circuit, an indication of a voltage level of a battery supplying power to a linear regulator, determining, based on the voltage level of the battery, an output voltage level for the linear regulator that permits the linear regulator to operate in an active condition in which noise of the power supplied by the battery is mitigated, and configuring the linear regulator to output regulated power at the output voltage level effective to provide low-noise regulated power for components of a device.

A device is described that includes a dynamic voltage manager that is configured to receive, from a voltage detector, an indication of a voltage level of a battery, determine, based on the voltage level of the battery and a dropout voltage of a linear regulator, an output voltage level for the linear regulator that permits the linear regulator to operate in an active condition in which noise of battery supplied power is mitigated, limit the output voltage level to an operational voltage range of components receiving the regulated power, and configure the linear regulator to provide the regulated power at the limited output voltage level effective to provide low-noise regulated power to the components.

A System-on-Chip (SoC) is described that includes a power amplifier and a dynamic voltage manager configured to receive, from a voltage detection circuit, a first set of bits indicating a voltage level of a battery supplying power to a linear regulator, subtract an offset from the first set of bits to account for a dropout voltage of the linear regulator effective to provide a second set of bits useful to set an output voltage level of the linear regulator, and set the output voltage level of the linear regulator using the second set of bits effective to cause the linear regulator to the provide regulated power to the power amplifier at the output voltage level.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional power supplies of battery-powered devices are implemented with fixed output voltages that may restrict use of power provided by a battery or introduce noise into power output by the power supplies. This noise can disrupt operation of various components of a device, which prevents the device from operating properly or effectively reduces a useful runtime of the device. This disclosure describes apparatuses and techniques for low-noise regulation of battery power that vary an output voltage of a linear regulator. An output voltage level for a linear regulator is determined based on a voltage level of a battery supplying power to the linear regulator. This output voltage level is determined such that the linear regulator is permitted to operate in an active condition in which noise of the battery power is mitigated. The linear regulator is then configured to output regulated power at the output voltage level effective to provide low-noise regulated power for components of a device. By so doing, low-noise power may be provided to components of the device over an extended range of battery voltage.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
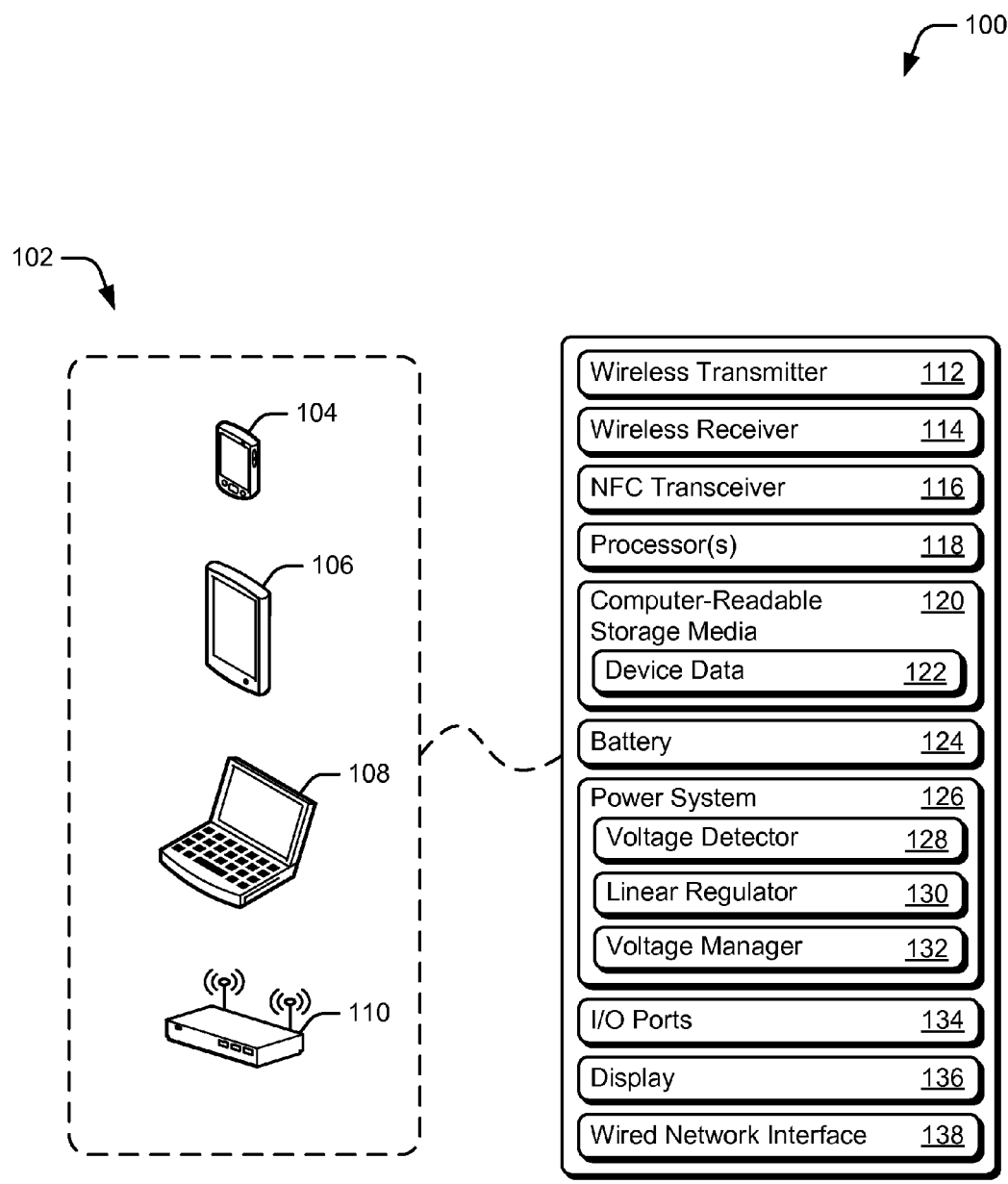
FIG. 1 illustrates an operating environment having battery-powered devices in accordance with one or more aspects.

FIG. 1 illustrates an example operating environment 100 having battery-powered devices 102, each of which are capable of communicating, accessing, presenting, or processing various data. Battery-powered devices 102 include smartphone 104, tablet computer 106, laptop computer 108, and mobile hotspot 110. Although not shown, other configurations of battery-powered devices 102 are also contemplated such as a mobile-internet device (MID), gaming console, electronic reader or book (e-reader or e-book), broadband router, networked media player, and other portable consumer devices.

Each battery-powered device 102 includes a wireless transmitter 112 (transmitter 112) and a wireless receiver 114 (receiver 114) for providing a wireless interface to handle various communication protocols, such as for example IEEE 802.11-2007, IEEE 802.11n, IEEE 802.11u, Bluetooth™, Zigbee® and the like. When communicating in accordance with these communication protocols, battery-powered device 102 may exchange data with other devices or networks via any suitable wireless-local-area network (WLAN) or short-range wireless network. Alternately or additionally, transmitter 112 and receiver 114 may be implemented to provide a wireless interface for communicating via a cellular network (e.g., long-term evolution (LTE)) or wireless wide-area network (WWAN). Transmitter 112 and receiver 114 may be separate (shown) or combined (not shown) and may be hardware combined with or separate from firmware or software.

Battery-powered devices 102 may also include near-field communication (NFC) transceiver 116 for communicating with other NFC-enabled devices or NFC chips. NFC transceiver 116 may communicate via radio frequency identification (RFID) standards, such as ISO/IEC 1443, Felicity Card (FeliCa), ISO/IEC 18092, and the like. NFC transceiver 116 enables data exchanges for services, such as contactless payment, currency exchange, virtual wallet functions, identification, boot-strapping other wireless connections (e.g., enabling WiFi® or Bluetooth™ connectivity), and so on. NFC transceiver 116 may be implemented as a single combined transceiver (shown) or as a separate transmitter and receiver (not shown) and may be hardware combined with or separate from firmware or software.

Battery-powered devices 102 include processor(s) 118, computer-readable storage media 120 (CRM 120), and device data 122, which is embodied on CRM 120. Processor 118 can be any suitable type of processor, either single-core or multi-core, for executing instructions or code associated with applications and/or an operating system of the battery-powered device 102 (e.g., a heterogeneous multi-core application processor). CRM 120 may include any suitable memory or storage device such as random-access memory (RAM), static RAM (SRAM), non-volatile RAM (NVRAM), read-only memory (ROM), or Flash memory useful to store device data 122. Device data 122 includes data of applications and/or an operating system of the battery-powered device 102.

Battery-powered devices 102 also each include battery 124 and power system 126. Battery 124 may comprise one or more battery cells of any suitable chemistry, such as nickel metal hydride (NiMH), lithium ion (Li-ion), lithium ion polymer (Li—Po) and the like. Further, battery 124 can be configured as an integrated component of battery-powered device 102 or a battery pack removable from battery-powered device 102. Battery 124 provides operational power for battery-powered device 102 when an external power source, such as an AC adapter, is unavailable or not connected to battery-powered device 102. When connected to an external power source, battery-powered device 102 or an external charger sources power to charge battery 124. A voltage level of battery 124 increases as battery 124 receives power while charging or decreases while battery 124 provides power that is consumed by battery-powered device 102 or components thereof. Typically, a voltage of battery 124 ranges from 3.0 volts to 4.2 volts or a multiple thereof when cells of battery 124 are configured in series.

Power system 126 includes voltage detector 128, linear regulator 130, and dynamic voltage manager 132 (voltage manager 132). Although not shown, power system 126 may also include a battery charger for charging battery 124 when external power is available. Components of power system 126 may be implemented using hardware, circuitry, digital logic, firmware, or any suitable combination thereof. Voltage detector 128 detects a voltage level of battery 124 and may quantify and/or report the voltage level of battery 124 to other entities of power system 126. Linear regulator 130 may be any suitable type of regulator, such as a low-dropout voltage (LDO) regulator. Linear regulator 130 regulates power supplied by battery 124 to provide regulated power to components of battery-powered device 102. Voltage manager 132, in at least some aspects, configures or adjusts an output voltage level of linear regulator 130. The implementation and use of voltage manager 132 varies and is described below.

Battery-powered device 102 may also include I/O ports 134, display 136, and wired network interface 142. I/O ports 134 allow battery-powered device 102 to interact with other devices or users. I/O ports 134 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with I/O ports 134, such as human-input devices (HIDs), external computer-readable storage media, or other peripherals.

Display 136 may present a user interface or rendered graphics associated with an operating system or application of battery-powered device 102. Display 136 may include a touch-input sensor (not shown), such as a touch screen or touch-sensitive overlay. Wired network interface 138 provides connectivity to one or more wired networks and other devices connected therewith. Data communicated over wired network interface 138 may be packetized or framed depending on a communication protocol or standard by which battery-powered device 102 is communicating. Wired network interface 138 may include any suitable wired interface, such as Ethernet, serial, or fiber optic interfaces for communication over a local network, intranet, or the Internet.

Figure 2:
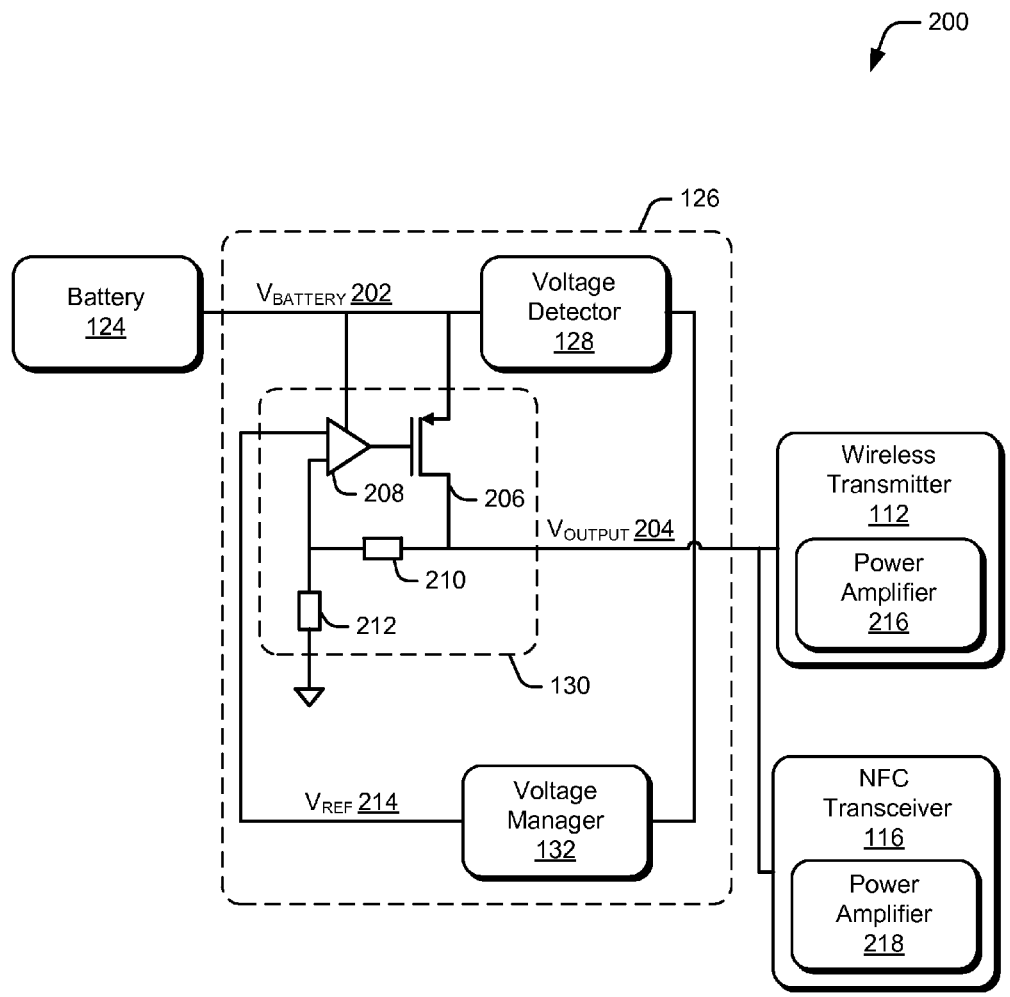
FIG. 2 illustrates an example power system of a battery-powered device of FIG. 1 in accordance with one or more aspects.

FIG. 2 illustrates an example of power system 126 at 200, including voltage detector 128, linear regulator 130, and voltage manager 132. Battery 124 supplies power to power system 126 at voltage $V_{BATTERY}$ 202, which is detected by voltage detector 128. Voltage detector 128 may be implemented using a successive approximation register analog-to-digital converter (SARADC) that quantifies $V_{BATTERY}$ 202 as a set of bits. Linear regulator 130 regulates power supplied by battery 124 to provide regulated power at voltage $V_{OUTPUT}$ 204. The regulated power is consumed by components of battery-powered device, such as wireless transmitter 112 and NFC transceiver 116.

Linear regulator 130 includes a p-channel metal-oxide-semiconductor field effect transistor 206 (PMOS 206) that acts as a pass element of linear regulator 130. Linear regulator 130 also includes error-amplifier 208 that receives feedback of $V_{OUTPUT}$ 204 via series feedback component 210 and shunt feedback component 212. Error-amplifier 208 drives PMOS 206 based on a comparison of the feedback of $V_{OUTPUT}$ 204 and reference voltage $V_{REF}$ 214. Error-amplifier 208 is configured to vary a drive voltage applied to PMOS 206 to provide regulated power at $V_{OUTPUT}$ 204. Series feedback component 210 and shunt feedback component 212 may be configured as any suitable type of feedback network and may include resistors or capacitors.

Generally, linear regulator 130 regulates variable voltage power supplied by battery 124 to provide regulated power at $V_{OUTPUT}$ 204. Linear regulator 130 operates in an active condition in which power is regulated or a dropout condition in which power is not regulated. When sufficient headroom (e.g., 50 millivolts to 200 millivolts) exists between $V_{BATTERY}$ 202 and $V_{OUTPUT}$ 204, PMOS 206 is able to operate in a linear region and linear regulator 130 operates in an active condition. While operating in the active condition, linear regulator 130 rejects or mitigates noise (e.g., voltage ripple) of the power supplied by battery 124. A level of noise rejected by linear regulator 130 (e.g., power supply rejection ratio (PSRR)) may be related to a gain of a feedback loop of error-amplifier 208. Low-noise regulated power is then supplied at $V_{OUTPUT}$ 204 to components of battery-powered device 102, such as wireless transmitter 112 and NFC transceiver 116.

When insufficient headroom exists between $V_{BATTERY}$ 202 and $V_{OUTPUT}$ 204, PMOS 206 saturates and linear regulator 130 enters a dropout condition. While in the dropout condition, linear regulator 130 is unable to effectively reject noise of power supplied by the battery and $V_{OUTPUT}$ 204 may fall out of regulation (e.g., below a minimum specified voltage output level). In some cases, entry of the dropout condition can be avoided by lowering $V_{OUTPUT}$ 204, effectively increasing an amount of headroom between $V_{BATTERY}$ 202 and $V_{OUTPUT}$ 204. In such cases, this may permit components associated with linear regulator 130 to continue operation and increase an effective runtime of battery-powered device 102.

As shown in FIG. 2, wireless transmitter 112 and NFC transceiver 116 include power amplifier 216 and power amplifier 218 respectively for amplifying signals prior to transmission. Power amplifier 216 and power amplifier 218 are examples of noise-sensitive components, the operation of which can be compromised by noise or voltage ripple of a power source. For example, when power amplifier 216 is active (e.g., while wireless transmitter 112 is transmitting) noise on power supplied to wireless transmitter 112 can disrupt operation of power amplifier 216 and cause packet loss.

Alternately or additionally, components of battery-powered device 102 may be configured to receive power within an operational voltage range, over which the components are designed to operate. This operational voltage range is typically based on a nominal operating voltage and includes a particular level of tolerance, such as five or ten percent. For example, power amplifier 216 may have a nominal operating voltage specified at 3.3 volts and an operational voltage range of 3.0 volts to 3.6 volts based on a ten-percent tolerance. In some cases, supplying power to components of battery-powered device 102 at voltages above a nominal operating voltage, but within an operational voltage range, increases an efficiency of the components. In other cases, supplying power to components at voltages below a nominal operating voltage (e.g., down to 2.7 volts) increases an effective runtime of battery-powered device 102 by permitting extended drawdown of battery 124.

In this particular example, voltage manager 132 can adjust or set $V_{REF}$ 214 to provide low-noise regulated power to power amplifier 216 and power amplifier 218. In the context of FIG. 2, voltage manager 132 receives an indication of the voltage of battery 124 from voltage detector 128. Voltage manager 132 then determines, based on the voltage level of battery 124, a $V_{OUTPUT}$ 204 that permits the linear regulator 130 to operate in an active condition. While operating in this active condition, linear regulator 130 mitigates the noise of the power supplied by battery 124. In some cases, voltage manager 132 determines a maximum $V_{OUTPUT}$ 204 at which power amplifier 216 and power amplifier 218 can receive regulated power (e.g., 3.6 volts). This may be effective to increase an efficiency of linear regulator 130, power amplifier 216, and/or power amplifier 218. This and other implementations of voltage manager 132 vary and are described below.

Techniques of Low-Noise Regulation of Battery Power

The following discussion describes techniques of low-noise regulation of battery power. These techniques can be implemented using the previously described environments or entities, such as voltage manager 132 of FIG. 1 embodied on a battery-powered device 102. These techniques include methods illustrated in FIGS. 3, 5, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
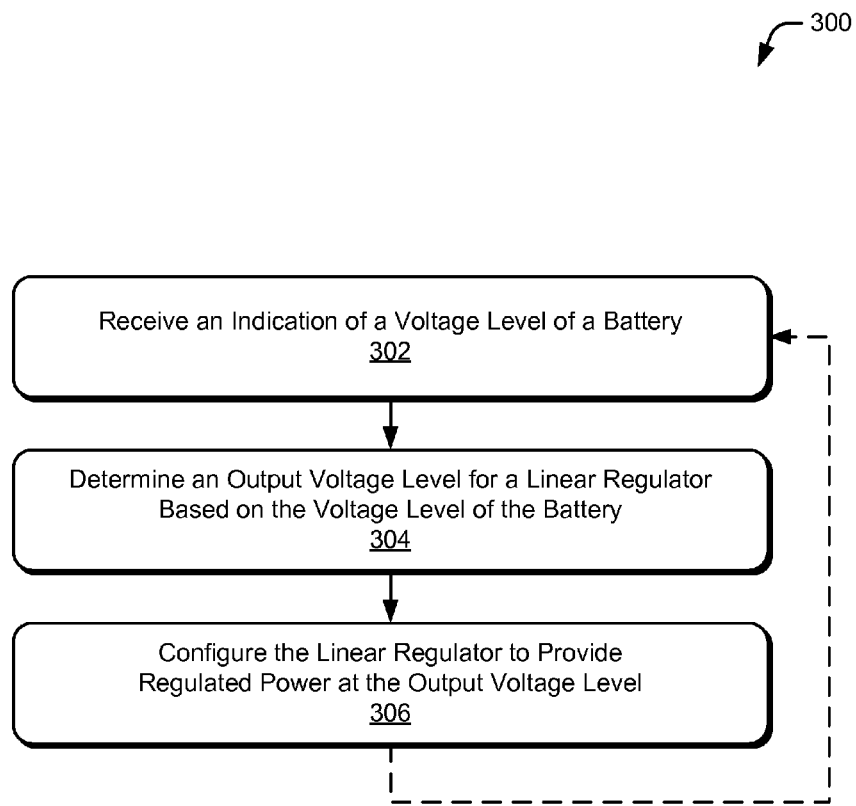
FIG. 3 illustrates a method for determining an output voltage level for a linear regulator based on a voltage level of a battery.

FIG. 3 depicts a method 300 for determining an output voltage level for a linear regulator based on a voltage level of a battery, including operations performed by voltage manager 132 of FIG. 1.

At 302, an indication of a voltage level of a battery is received. This indication may be received from an analog-to-digital circuit, such as a circuit including a SARADC. The battery is operably associated with a linear regulator that is configured to provide regulated power for components of a device. Some of these components are sensitive to noise, which is often associated with power supplied from a battery. In some cases, the linear regulator is a low-dropout (LDO) regulator having a dropout voltage within an approximate range of 50 millivolts to 200 millivolts. This dropout voltage specifies headroom between an input voltage (e.g., battery voltage) and an output voltage of the LDO. When sufficient headroom is available, the LDO operates in an active condition in which noise or voltage ripple associated with the battery power is mitigated.

Figure 4:
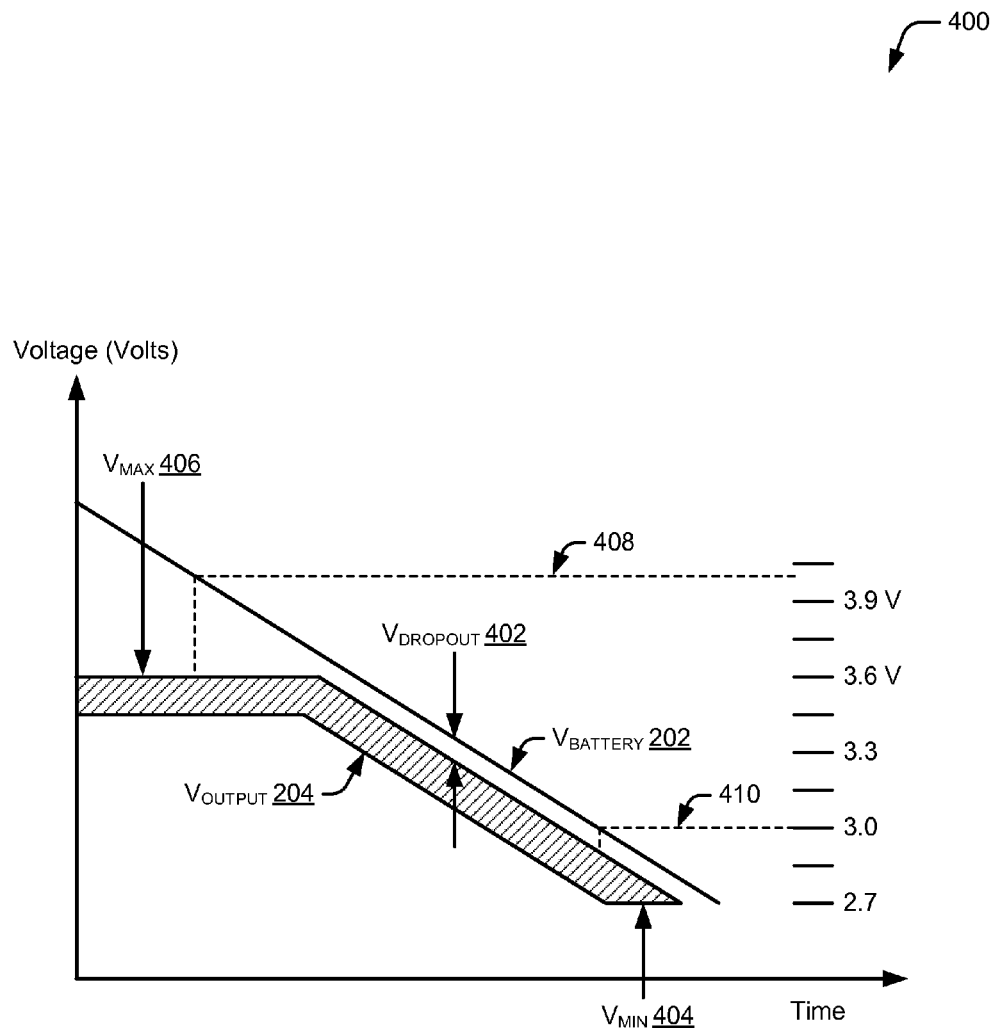
FIG. 4 is a graph illustrating example voltage profiles of a battery and linear regulator over time in accordance with one or more aspects.

As an example, consider power system 126 of smart-phone 104 in the context of FIG. 2, which shows linear regulator 130 providing regulated power to power amplifier 216 and power amplifier 218. Assume that a user of smart-phone 104 is browsing the Internet using a wireless connection provided by wireless transmitter 112 and wireless receiver 114, which is configured for WiFi communication. Power amplifier 216 consumes power provided by linear regulator 130 when wireless transmitter 112 transmits data. As power is consumed by wireless transmitter 112 and other components of smart-phone 104, a voltage level of battery 124 decreases. In the context of FIG. 4, which illustrates voltage profiles of $V_{BATTERY}$ 202 and $V_{OUTPUT}$ 204 over time at 400, assume that the voltage of battery 124 ($V_{BATTERY}$ 202) is currently 4.0 volts. Here, voltage detector 128 detects the voltage level of battery 124 and converts the voltage level into a digital indication (e.g., a set of bits). Voltage manager 132 then receives this digital indication from voltage detector 128.

At 304, an output voltage level ($V_{OUTPUT}$ 204) for a linear regulator is determined based on the voltage level of the battery ($V_{BATTERY}$ 202). This output voltage level is a level at which the linear regulator is permitted to operate in an active condition. For example, the output voltage level may be determined in part by subtracting an approximation of a dropout voltage of the regulator ($V_{DROPOUT}$ 402) from the voltage level of the battery. As described above, when operating in an active condition, noise of the power supplied by the battery is mitigated resulting in low-noise regulated power.

In some cases, the output voltage level is limited to an operational voltage range of the components of the device. In such cases, the operational voltage range of the components of the device includes an approximate range of 2.7 volts ($V_{MIN}$ 404) to 3.6 volts ($V_{MAX}$ 406). Alternately or additionally, an offset ($V_{ERROR}$) is applied to the voltage level of the battery to account for measurement errors. Further, another offset ($V_{SW}$) can be applied to further tune the output voltage of the linear regulator based on software settings. In some aspects, a hardware circuit and/or digital logic is configured to determine an output voltage level for the linear regulator using Equation 1 as shown below.

$$V_{OUTPUT\ 204} = MAX(V_{MIN\ 404}, MIN(V_{MAX\ 406}, ((V_{BATTERY\ 202} \pm V_{ERROR}) - V_{DROPOUT\ 402}))) \pm V_{SW} \quad \text{Equation 1}$$

In the context of the present example, and with reference to FIG. 4, voltage manager 132 of smart-phone 104 determines $V_{OUTPUT}$ 204 for linear regulator based on $V_{DROPOUT}$ 402, $V_{MIN}$ 404, and $V_{MAX}$ 406. In this particular example, $V_{DROPOUT}$ 402 is approximately 100 millivolts, $V_{MIN}$ 404 is approximately 2.7 volts, and $V_{MAX}$ 406 is approximately 3.6 volts. As shown in FIG. 4, voltage manager 132 determines that $V_{OUTPUT}$ 204 is 3.6 volts as limited by $V_{MAX}$ 406 (dashed line 408 provided for visual clarity), which is configured to protect circuitry of power amplifier 216 and power amplifier 218 from over-voltage conditions. Here, 3.6 volts is determined as the maximum $V_{OUTPUT}$ 204 at which linear regulator is permitted to operate in an active condition without exceeding a maximum voltage limit. In this particular example, supplying regulated power at 3.6 volts, rather than at a nominal 3.3 volts, is effective to increase an efficiency of power amplifier 216 of wireless transmitter 112.

At 306, the linear regulator is configured to output regulated power at the output voltage level. This may be effective to provide low-noise regulated power for the components of the device. In some cases, configuring the linear regulator includes varying a reference voltage (e.g., $V_{REF}$ 214) of the linear regulator. In such cases, varying the reference voltage includes changing an analog reference voltage or configuring set binary values (e.g., binary inputs of the linear regulator).

Configuring the linear regulator to output regulated power at different voltage levels permits low-noise regulated power to be provided over a range of voltages. For example, when a voltage level of a battery is greater than approximately 3.7 volts, the linear regulator can be configured to provide regulated power at about 3.6 volts, which can increase efficiency of components. Alternately, when the voltage level of the battery is approximately than 3.3 volts, the linear regulator can be configured to provide regulated voltage at 3.1 volts. By so doing, the linear regulator has sufficient headroom to operate in an active condition in which noise of the power supplied from the battery is mitigated. Accordingly, low-noise regulated power can be provided at voltages below a nominal 3.3 volt level, such as voltages as low as 2.4 to 2.7 volts.

Additionally, operations 302, 304, or 306 of method 300 may be performed iteratively to dynamically adjust, based on a variable voltage level of a battery, the output voltage level of the linear regulator. In such cases, iterations of method 300, or operations thereof, may each consume approximately 10 milliseconds to 100 milliseconds to complete. This may be effective to dynamically adjust the output voltage level of the linear regulator at a faster rate than allowed by other techniques, such as those implemented using software monitoring or interrupts.

Concluding the present example, voltage manager 132 configures linear regulator 130 to provide regulated power to power amplifier 216 at $V_{OUTPUT}$ 204 (3.6 volts). Additionally, as shown in FIG. 4, $V_{OUTPUT}$ 204 may vary (e.g., within the illustrated shaded region) depending on various offsets and tuning that may be applied in specific situations. In most cases, linear regulator 130 is capable of providing low-noise power to components of smart-phone 104 as long as sufficient headroom is maintained between $V_{BATTERY}$ 202 and $V_{OUTPUT}$ 204 (e.g., by decreasing $V_{OUTPUT}$ 204).

Figure 5:
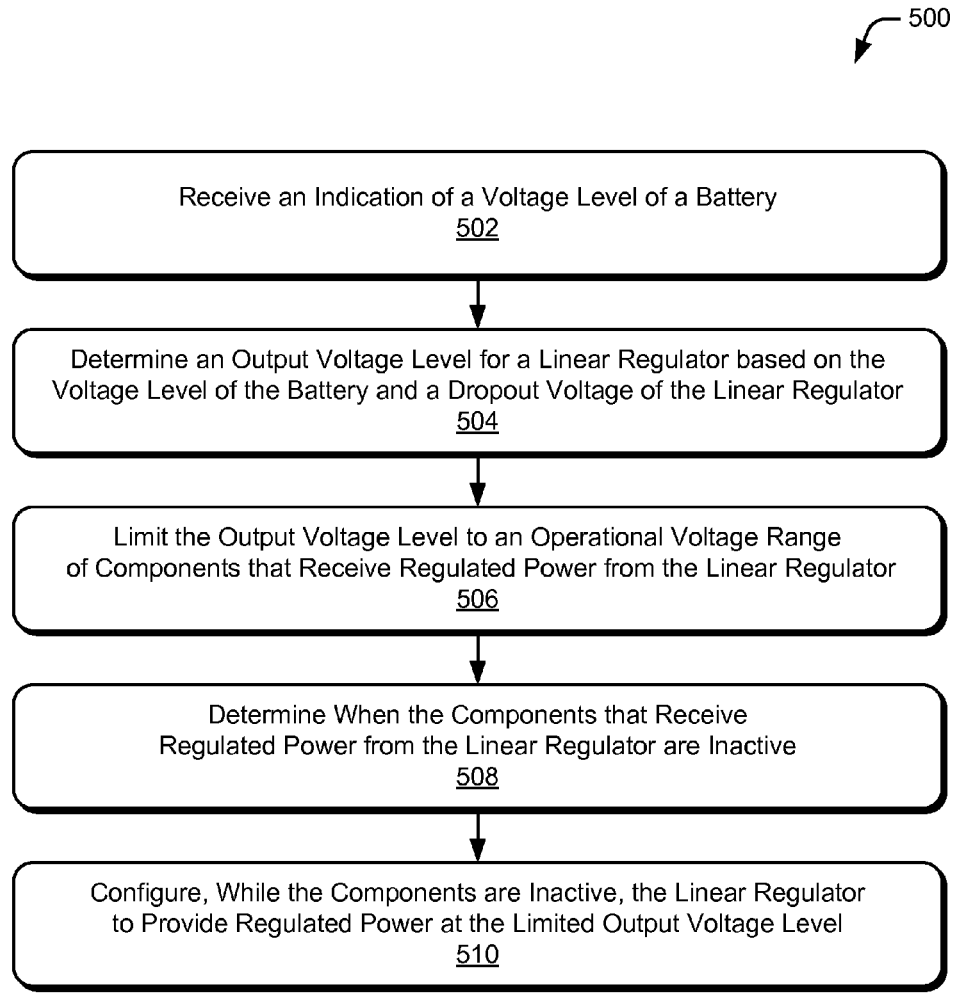
FIG. 5 illustrates a method for configuring a linear regulator to provide regulated power at a limited output voltage level.

FIG. 5 depicts a method 500 for configuring a linear regulator to provide regulated power at a limited output voltage level, including operations performed by voltage manager 132 of FIG. 1.

At 502, an indication of a voltage level of a battery is received. This indication may be received from an analog-to-digital circuit, such as a circuit including a SARADC. The battery provides power to a linear regulator, which in turn is configured to supply regulated power to components of a device. Some of these components are sensitive to noise, which is often associated with power supplied from batteries or other low-impedance sources. The linear regulator may be a low-dropout (LDO) regulator having a dropout voltage within an approximate range of 50 millivolts to 200 millivolts. This dropout voltage specifies headroom between an input voltage and an output voltage of the LDO. When sufficient headroom is available, the LDO operates in an active condition in which noise or voltage ripple associated with the battery power is mitigated.

At 504, an output voltage level for a linear regulator is determined based on the voltage level of the battery and a dropout voltage of the linear regulator. This output voltage level is a level at which the linear regulator is permitted to operate in an active condition. For example, the output voltage level may be determined in part by subtracting an approximation of the dropout voltage from the voltage level of the battery. As described above, when operating in an active condition, the linear regulator rejects noise of the power supplied by the battery to provide low-noise regulated power.

At 506, the output voltage level is limited to an operational voltage range of the components of the device to provide a limited output voltage level. The limited output voltage level is effective to enable reliable operation of, or prevent damage to, the components of the device. The output voltage level may be limited to a minimum or a maximum operational voltage of the components. In some cases, the operational voltage range of the components of the device includes an approximate range of 2.7 volts to 3.6 volts. In other cases, an extended operational voltage range for more robust components may include an approximate range of 2.4 volts to 3.9 volts. Alternately or additionally, an offset can be applied to further tune the output voltage of the linear regulator using software settings.

At 508, it is determined when the components that receive regulated power from the linear regulator are inactive. This may be effective to prevent an output voltage level of the linear regulator from being adjusted while the components are active. In some cases, changing or altering a voltage of the regulated power can disrupt operation of the components. For example, changing voltage of power supplied to an RF power amplifier may cause signal distortion or packet loss. Accordingly, an enable bit may be set based on operation 508 that permits or prevents adjustment of the output voltage of the linear regulator depending on an operational status of the components of the device.

At 510, the linear regulator is configured, while the components are inactive, to provide regulated power at the limited output voltage level. This may be effective to provide low-noise regulated power for the components of the device. In some cases, configuring the linear regulator includes varying a reference voltage of the linear regulator. In such cases, varying the reference voltage includes changing an analog reference voltage or configuring set binary values (e.g., binary inputs of the linear regulator).

Configuring the linear regulator to output regulated power at different voltage levels permits low-noise regulated power to be provided over a range of voltages. For example, when a voltage level of a battery is greater than 3.8 volts, the linear regulator can be configured to provide regulated power at 3.6 volts, which can increase efficiency of components. Alternately, when the voltage level of the battery is approximately than 3.3 volts, the linear regulator can be configured to provide regulated power at about 3.1 volts. By so doing, the linear regulator has sufficient headroom to operate in an active condition in which noise of the power supplied from the battery is mitigated. Accordingly, low-noise regulated power can be provided at voltages below a nominal 3.3 volt level, such as voltages as low as 2.4 volts to 2.7 volts.

Additionally, operations 502, 504, 506, 508, or 510 of method 500 may be performed iteratively to dynamically adjust, based on a variable voltage level of a battery, the output voltage level of the linear regulator. In such cases, iterations of method 500 may each consume approximately 10 milliseconds to 100 milliseconds to complete. This may be effective to dynamically adjust the output voltage level of the linear regulator without disrupting operation of components of the device, such as RF power amplifiers or other voltage-sensitive components.

Figure 6:
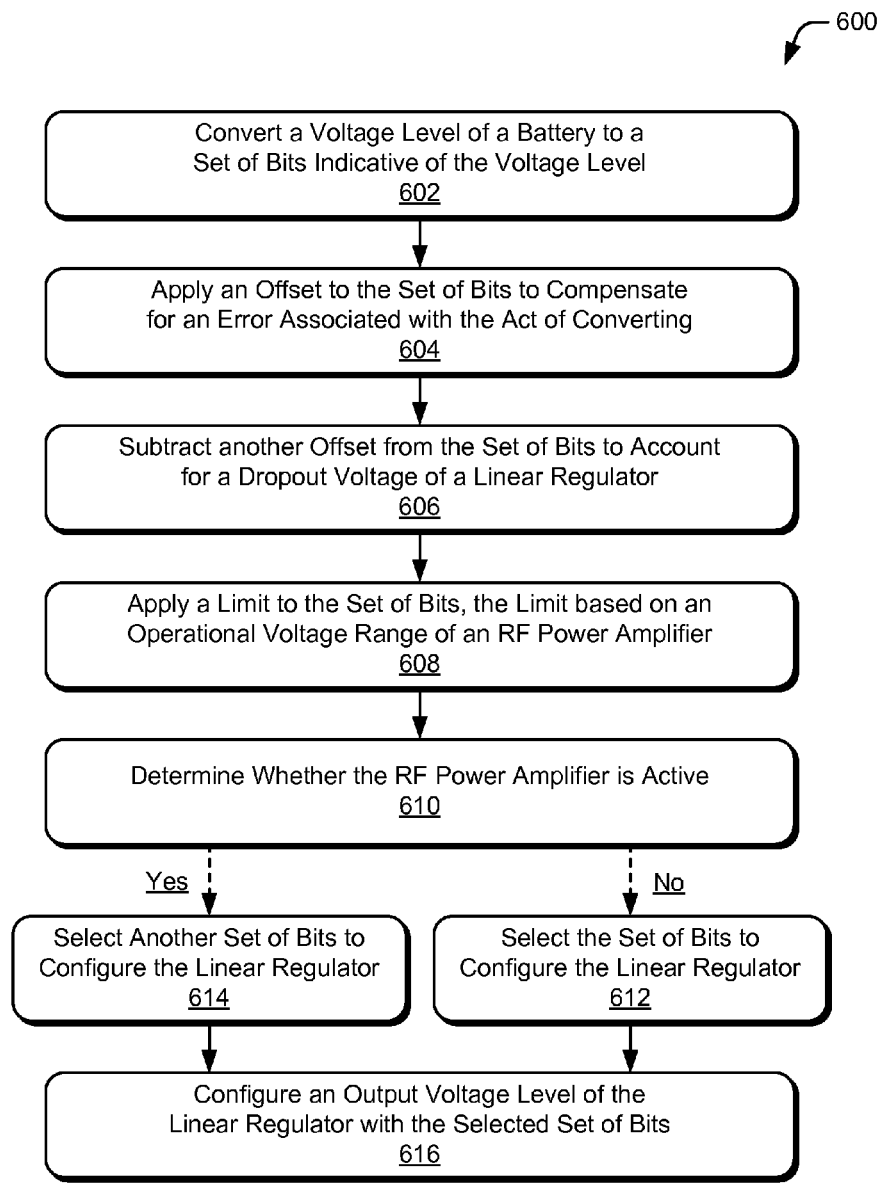
FIG. 6 illustrates a method for configuring an output voltage level of a linear regulator using a set of bits.

FIG. 6 depicts a method 600 for configuring an output voltage level of a linear regulator using a set of bits, including operations performed by voltage manager 132 of FIG. 1.

At 602, a voltage level of a battery is converted to a set of bits that indicate the voltage level. The voltage level of the battery is converted using an analog-to-digital converter, such as a successive approximation register analog-to-digital converter (SARADC). The voltage level of the battery may be measured and/or converted at a frequency of approximately 2 megahertz. From these measured voltage levels, a lowest indicated voltage of the battery is determined. The lowest indicated voltage level can be determined over an interval of approximately 100 milliseconds. In some cases, the set of bits indicating the voltage level of the battery includes six bits that each represent a 50 millivolt step of voltage. In such cases, a voltage range of 2.5 volts to 5.2 volts is represented in 55 discrete voltage steps, such as an output code ranging from 5 to 59.

At 604, an offset is applied to the bits to compensate for an error associated with the bit conversion process. This offset may be calculated or configured via an operating system of a battery-powered device. Prior to calculating the offset, the offset is set to a default value, such as zero millivolts. Alternately or additionally, this offset may be used to calibrate circuitry used to detect the voltage level of the battery. In some cases, a set of bits indicating the offset includes four bits that each represent a 50 millivolt step of voltage. In such cases, the offset includes a voltage range of −200 millivolts to 200 millivolts that is represented in 9 discrete voltage steps of 50 millivolts.

At 606, another offset is subtracted from the set of bits to account for a dropout voltage of a linear regulator. The linear regulator is configured to receive power from the battery and provide regulated power to components of a device, such as RF power amplifiers. Subtracting this offset can be effective permit the linear regulator, when configured based on the set of bits, to operate in an active condition. In some cases, a set of bits indicating the offset for a linear regulator includes four bits that each represent a 50 millivolt step of voltage. In such cases, the offset includes a voltage range of −200 millivolts to 200 millivolts that is represented in 9 discrete voltage steps of 50 millivolts.

At 608, a limit is applied to the set of bits, the limit based on an operational voltage range of an RF power amplifier. Applying the limit prevents the set of bits from representing a voltage outside of the operational voltage range of the RF power amplifier or other components of the battery-powered device. In some cases, multiple limits are applied to the set of bits to limit a minimum and a maximum output voltage level of the linear regulator.

For example, a limit for a minimum voltage may range from approximately 2.4 volts to 3.1 volts, with a default value of about 2.7 volts. In some cases, this minimum voltage limit is configurable at 100 millivolt steps using a 3-bit register. A limit for a maximum voltage may range from approximately 3.3 volts to 4.0 volts, with a default value of about 3.6 volts. In some cases, this maximum voltage limit is configurable at 100 millivolt steps using a 3-bit register.

At 610, it is determined whether the RF power amplifier is active. When the RF power amplifier is active, adjusting an output voltage of the linear amplifier can disrupt amplification of an RF signal resulting in packet loss. Accordingly, an enable bit may be set based on operation 610 that permits or prevents adjustment of the output voltage of the linear regulator depending on an operational status of the power amplifier.

From operation 610, method 600 proceeds to either operation 612 or to operation 614. At 612, the set of bits is selected for use in configuring the linear regulator if the RF power amplifier is not active. A voltage represented by the set of bits may vary from a current output voltage of the linear regulator. Accordingly, the set of bits are selected for use in configuring the linear amplifier when the RF power amplifier is not active so that communication is not disrupted if the output voltage of the linear amplifier changes.

At 614, another set of bits is selected for use in configuring the linear regulator if the RF power amplifier is active. The other set of bits represents a current output voltage of the linear regulator and are stored in a register or other hardware. This other set of bits may have been determined during a previous iteration of method 600. The other set of bits are selected for use in configuring the linear amplifier when the RF power amplifier is active to ensure that ongoing communication is not disrupted by changes in the output voltage of the linear amplifier.

At 616, an output voltage level of the linear regulator is configured with the selected set of bits. The selected set of bits may include five bits representing an output voltage level ranging from approximately 2.4 volts to 3.95 volts with a granularity of 50 millivolts per bit-code. The output voltage level of the linear regulator is set to a voltage level represented by the selected set of bits. In some cases, the output voltage level is set to a current output voltage level to ensure operation of an RF amplifier is not disrupted. In other cases, the output voltage level is set to a different voltage level based on a voltage level of a battery supplying power to the linear regulator.

For example, if the battery voltage level is 3.8 volts, the output voltage level of the linear regulator is set to 3.6 volts. This can be effective to increase an efficiency of the RF power amplifier, which consumes less current to amplify RF signals at higher voltages. Alternately, if the battery voltage is 3.0 volts as shown in FIG. 4, the output voltage level of the linear regulator is set to 2.9 volts (dashed line 410 provided for visual clarity). This can be effective to permit the linear regulator to continue to operate in an active condition in which low-noise regulated power is supplied to the RF power amplifier.

System-on-Chip

Figure 7:
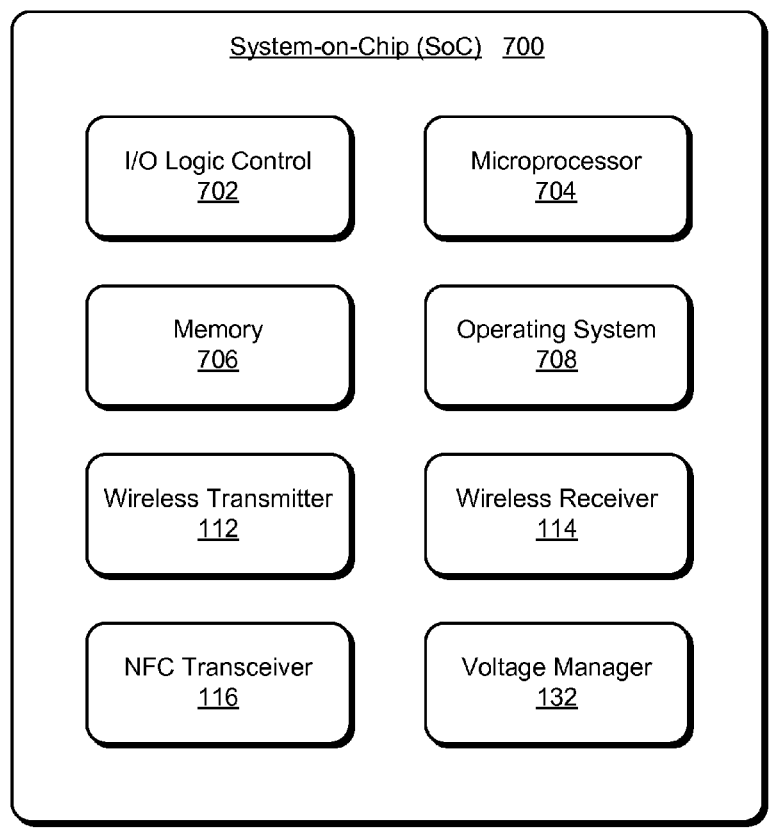
FIG. 7 illustrates a System-on-Chip (SoC) environment for implementing aspects of the techniques described herein.

FIG. 7 illustrates a System-on-Chip (SoC) 700, which can implement various embodiments described above. A SoC can be implemented in any suitable device, such as a video game console, IP enabled television, smart-phone, desktop computer, laptop computer, tablet computer, server, network-enabled printer, set-top box, printer, scanner, camera, picture frame, and/or any other type of device that may implement wireless connective technology.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., Flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes wireless transmitter 112, wireless receiver 114, NFC transceiver 116, and voltage manager 132 (embodied as disparate or combined components as noted above). Examples of these various components, functions, and/or entities, and their corresponding functionality, are described with reference to the respective components of the environment 100 shown in FIG. 1 and FIG. 2.

Voltage manager 132, either independently or in combination with other entities, can be implemented as hardware, circuitry, digital logic and the like. Some functionalities of voltage manager 132 may be implemented via computer-executable instructions maintained by memory 706 and executed by microprocessor 704 to implement various embodiments and/or features described herein. Voltage manager 132 may also be provided integral with other entities of the SoC, such as integrated with one or both of I/O logic controller 702 or any packet-based interface within SoC 700. Alternatively or additionally, voltage manager 132 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method implemented at least in part via circuitry, the method comprising:

receiving, from a voltage detection circuit, an indication of a voltage level of a battery supplying power to a linear regulator, the linear regulator configured to regulate the power supplied by the battery to provide regulated power for components of a device, the indication comprising a first set of bits;

determining, based on the voltage level of the battery, an output voltage level for the regulated power that permits the linear regulator to operate in an active condition in which noise of the power supplied by the battery is mitigated, the determining comprising subtracting an offset from the first set of bits to account for a dropout voltage of the linear regulator effective to provide a second set of bits useful to set the output voltage level;

configuring the linear regulator to output the regulated power at the output voltage level using at least the second set of bits effective to provide low-noise regulated power for the components of the device;

applying a limit to the second set of bits effective to limit the output voltage level to an operational voltage range of the components of the device; and applying another offset to the first set of bits prior to subtracting the offset to compensate for an error associated with the voltage detection circuit.

2. The method of claim 1, wherein the components of the device include a radio frequency (RF) power amplifier of a wireless transmitter, and further comprising delaying the act of configuring until the RF power amplifier is not active effective to prevent transmissions of the wireless transmitter from being disrupted.

3. The method of claim 1, wherein the offset, the other offset, and the limit are each represented by a respective set of bits stored in a respective register.

4. The method of claim 1, wherein the operational voltage range of the components of the device includes an approximate range of 2.7 volts to 3.6 volts.

5. The method of claim 1, wherein the linear regulator is a low-dropout (LDO) regulator having a dropout voltage within an approximate range of 50 millivolts to 200 millivolts.

6. The method of claim 1, wherein the method is performed iteratively, the iterations of the method each performed within a range of approximately 10 milliseconds to 100 milliseconds.

7. The method of claim 5, wherein the linear regulator operates in a dropout condition instead of the active condition when the voltage level of the battery and the output voltage level of the regulated power differ by less than the dropout voltage of the LDO regulator.

8. A device comprising:
a wireless transmitter configured to transmit data of the device, the wireless transmitter including a power amplifier for amplifying signals useful to transmit the data;
a linear regulator configured to regulate power supplied by a battery to provide regulated power for the power amplifier of the wireless transmitter;
a voltage detector configured to detect a voltage level of the battery; and
a dynamic voltage manager configured to:
receive, from the voltage detector, an indication of the voltage level of the battery, the indication comprising a first set of bits;
determine, based on the voltage level of the battery and a dropout voltage of the linear regulator, an output voltage level for the linear regulator that permits the linear regulator to operate in an active condition in which noise of the battery supplied power is mitigated, the determine comprising subtracting an offset from the first set of bits to account for the dropout voltage of the linear regulator effective to provide a second set of bits useful to set the output voltage level;
configure the linear regulator to provide the regulated power at the limited output voltage level using at least the second set of bits effective to provide low-noise regulated power to the power amplifier;
apply a limit to the second set of bits effective to limit the output voltage level to an operational voltage range of the components of the device; and
apply another offset to the first set of bits prior to subtracting the offset to compensate for an error associated with the voltage detection circuit.

9. The device of claim 8, wherein the dynamic voltage manager is further configured to determine whether the power amplifier is active and, if the power amplifier is active, delay the configuration of the linear regulator until a time when the power amplifier is not active.

10. The device of claim 8, wherein the other offset may be calculated and configured via an operating system of the device.

11. The device of claim 8, wherein the voltage detector and the dynamic voltage manager are implemented at least in part using digital logic.

12. The device of claim 8, wherein the limited output voltage level includes voltages within an approximate range of 3.3 volts to 3.7 volts effective to improve an efficiency of the power amplifier of the wireless transmitter.

13. The device of claim 8, wherein the wireless transmitter is configured to communicate via a wireless local-area-network (WLAN) or near-field communication (NFC).

14. The device of claim 8, wherein the voltage detector is implemented using a successive approximation register analog-to-digital converter.

15. A system-on-chip comprising:
a wireless transceiver including a power amplifier, the wireless transceiver configured to amplify, with the power amplifier, signals for communicating data;
an interface to a linear regulator from which the power amplifier receives regulated power; and
a dynamic voltage manager configured to:
receive, from a voltage detection circuit, a first set of bits indicating a voltage level of a battery supplying power to the linear regulator;
subtract an offset from the first set of bits to account for a dropout voltage of the linear regulator effective to provide a second set of bits useful to set an output voltage level of the linear regulator;
set the output voltage level of the linear regulator using the second set of bits effective to cause the linear regulator to the provide regulated power to the power amplifier at the output voltage level;
apply a limit to the second set of bits effective to limit the output voltage level to an operational voltage range of components of the system-on-chip; and
apply another offset to the first set of bits prior to subtracting the offset to compensate for an error associated with the voltage detection circuit.

16. The system-on-chip of claim 15, wherein the other offset may be used to:
calibrate circuitry used to detect the voltage; and
compensate for an error associated with a bit conversion process.

17. The system-on-chip of claim 15, wherein the wireless transceiver is configured to communicate the data using near field communication (NFC) or via a wireless local-area-network (WLAN).

18. The system-on-chip of claim 16, wherein the other offset may be calculated and configured via an operating system of a battery-powered device comprising the system-on-chip.

19. The system-on-chip of claim 18, wherein the offset, the other offset, and the limit are each represented by a respective set of bits stored in a respective register.

20. The system-on-chip of claim 19, wherein the dynamic voltage manager and the respective registers are implemented at least in part using digital logic.

* * * * *